United States Patent
Wang et al.

(10) Patent No.: US 12,444,153 B2
(45) Date of Patent: Oct. 14, 2025

(54) SCANNED DATA PROCESSING METHOD AND APPARATUS, DEVICE, AND MEDIUM

(71) Applicant: Shining 3D Tech Co., Ltd., Hangzhou (CN)

(72) Inventors: Wenbin Wang, Hangzhou (CN); Xiaobo Zhao, Hangzhou (CN); Tengfei Jiang, Hangzhou (CN); Jian Zhang, Hangzhou (CN); Leijie Huang, Hangzhou (CN)

(73) Assignee: Shining 3D Tech Co., Ltd., Hangzhou (CN)

( * ) Notice: Subject to any disclaimer, the term of this patent is extended or adjusted under 35 U.S.C. 154(b) by 0 days.

(21) Appl. No.: 19/169,708

(22) Filed: Apr. 3, 2025

(65) Prior Publication Data

US 2025/0232550 A1    Jul. 17, 2025

Related U.S. Application Data

(63) Continuation-in-part of application No. PCT/CN2023/118333, filed on Sep. 12, 2023.

(30) Foreign Application Priority Data

Dec. 2, 2022   (CN) .......................... 202211543180.9

(51) Int. Cl.
*G06K 9/00* (2022.01)
*G06V 10/10* (2022.01)
*G06V 10/40* (2022.01)

(52) U.S. Cl.
CPC .............. *G06V 10/16* (2022.01); *G06V 10/40* (2022.01)

(58) Field of Classification Search
CPC ................................ G06V 10/16; G06V 10/40
See application file for complete search history.

(56) References Cited

U.S. PATENT DOCUMENTS

| | | | |
|---|---|---|---|
| 2008/0101724 A1* | 5/2008 | Baker | G06V 10/24 382/284 |
| 2023/0135060 A1 | 5/2023 | Chen et al. | |

FOREIGN PATENT DOCUMENTS

| | | | | |
|---|---|---|---|---|
| CA | 2904542 C | * | 5/2017 | ............ B25J 9/1664 |
| CN | 105389787 A | * | 3/2016 | |
| CN | 109993696 A | * | 7/2019 | ............... G06T 7/33 |
| CN | 111314571 A | * | 6/2020 | ......... H04N 1/00005 |
| CN | 111739081 A | * | 10/2020 | ............. G06F 18/22 |
| CN | 112365506 A | * | 2/2021 | ............... G06T 7/11 |

(Continued)

OTHER PUBLICATIONS

Incremental and batch planar simplification of dense point cloud maps, T. Whelana et al., Elsevier, 2015, pp. 3-14 (Year: 2015).*

(Continued)

*Primary Examiner* — Jayesh A Patel
(74) *Attorney, Agent, or Firm* — ScienBiziP, P.C.

(57) ABSTRACT

The present application relates to a scanned data processing method, an apparatus, a device, and a medium. The method includes obtaining raw scanned data by scanning a current scanning area of a target object, acquiring non-planar target scanned data from the raw scanned data, and performing splicing on the target scanned data with historical scanned data and obtaining target spliced data. The present application may ensure smoothness and accuracy of the splicing.

17 Claims, 4 Drawing Sheets

(56) References Cited

FOREIGN PATENT DOCUMENTS

| CN | 115115593 A | * | 9/2022 | ............ | G06T 7/0002 |
| WO | WO-2021147961 A1 | * | 7/2021 | ......... | H04N 1/00018 |

OTHER PUBLICATIONS

A robust statistics approach for plane detection in unorganized point clouds, Abner M. C. Araújo, et al., Elsevier, 2020, pp. 1-12 (Year: 2020).*

Outlier detection and robust plane fitting for building roof extraction from LiDAR data, Emon Kumar Dey et al., ResearchGate, 2020, pp. 1-29 (Year: 2020).*

* cited by examiner

SCANNED DATA PROCESSING METHOD AND APPARATUS, DEVICE, AND MEDIUM

The present application claims the priority to Chinese patent application with application No. 202211543180.9, filed on Dec. 2, 2022, entitled "SCANNED DATA PROCESSING METHOD AND APPARATUS, DEVICE, AND MEDIUM" the content of which is hereby incorporated herein fully by reference into the present application for all purposes.

FIELD

The present application relates to a field of computer technology, and specifically to a scanned data processing method, an apparatus, a device and a medium.

BACKGROUND

When scanning an object, it is usually placed on a flat surface. During the scanning process, data of the flat surface accounts for a significant proportion of 3D data of the single-sided 3D data acquired, leading to issues such as incorrect splicing or difficulty in splicing during an alignment process.

SUMMARY

To solve at least part of the above technical problems, embodiments of the present application provide a scanned data processing method and apparatus, as well as a related electronic device and storage medium.

In a first aspect, a scanned data processing method is provided, the method including: obtaining raw scanned data by scanning a current scanning area of a target object; acquiring non-planar target scanned data from the raw scanned data; performing splicing on the target scanned data with historical scanned data and obtaining target spliced data, wherein the historical scanned data corresponds to a previously scanned area.

In an embodiment, the acquiring the non-planar target scanned data from the raw scanned data includes: identifying planar area data from the raw scanned data and obtaining the planar data; labeling the planar data; determining data from the raw scanned data without a label as the non-planar target scanned data.

In an embodiment, the method further includes: deleting the planar data from the raw scanned data according to the label.

In an embodiment, the performing splicing on the target scanned data with historical scanned data including: extracting surface features of the target scanned data and obtaining first feature data; performing splicing on the target scanned data and the historical scanned data according to the first feature data and second feature data, where the second feature data represent surface features of the historical scanned data.

In an embodiment, extracting surface features from the target scanned data and obtaining the first feature data includes: obtaining the first feature data by extracting the surface features of the target scanned data through a preset feature extraction model, wherein the surface features comprise spatial geometric features and/or texture features.

In an embodiment, the step of performing splicing on the target scanned data and the historical scanned data according to the first feature data and the second feature data includes: obtaining an initial splicing matrix by performing rough splicing on the target scanned data and the historical scanned data according to the first feature data and the second feature data; optimizing the initial splicing matrix and obtaining a target splicing matrix; obtaining target splicing data by performing precise splicing on the target scanned data and the historical scanned data according to the target splicing matrix; rendering and displaying the target splicing data.

In an embodiment, the obtaining the initial splicing matrix by performing rough splicing on the target scanned data and the historical scanned data according to the first feature data and the second feature data includes: identifying whether there is an overlapping area by comparing the first feature data with the second feature data, and obtaining the initial splicing matrix by performing rough splicing on the target scanned data and the historical scanned data according to the overlapping area.

In a third aspect, an embodiment of the present application further provides an electronic device, including: a storage device storing at least one instruction; and a processor, when the at least one instruction is executed by the processor, the processor is caused to: obtain raw scanned data by scanning a current scanning area of a target object; acquire non-planar target scanned data from the raw scanned data; perform splicing on the target scanned data with historical scanned data and obtain target spliced data, the historical scanned data corresponding to a previously scanned area.

In a fourth aspect, an embodiment of the present application further provides a non-transitory storage medium having at least one instruction stored thereon, when the at least one instruction is executed by a processor of an electronic device, the processor is caused to perform a scanned data processing method.

It is to be understood that the foregoing general description and the following detailed description are exemplary and explanatory only and are not restrictive of the present application.

BRIEF DESCRIPTION OF THE DRAWINGS

The accompanying drawings, which are incorporated into and constitute a part of this specification, illustrate embodiments consistent with the present application and, together with the description, serve to explain the principles of the present application.

To more clearly illustrate the embodiments of the present application or the technical solutions in the prior art, the following briefly introduces the drawings required for describing the embodiments or the prior art. It is apparent that, for those of ordinary skill in the art, other drawings can be derived from these accompanying drawings without creative effort.

DETAILED DESCRIPTION

In order to make purpose, technical solution and advantage of an embodiment of the present application clearer, the technical solution in the embodiment of the present application will be clearly and completely described below. Obviously, the described embodiment is part of embodiments of the present application, not all of the embodiments. Based on the embodiment of the present application, all other embodiments obtained by ordinary technicians in this field without creative work are within a scope of protection of the present application.

When scanning an object, the object is often placed on a plane. During scanning, the planar data accounts for a large proportion of the single-sided three-dimensional data obtained by scanning, especially when the object is a small object, which leads to problems such as mis-splicing or difficulty in splicing during splicing. To address this problem, a solution of markers-assisted splicing can be adopted; this solution requires pasting markers or placing objects with markers for assistance; at the same time, it is necessary to ensure that there are enough visible markers, otherwise they cannot be spliced. In order to see more markers, a larger scanning format is required, which further reduces the proportion of the object in the image. However, in the case of the same scanning resolution device, data details such as texture will be lost. In this case, the embodiments of the present application provide a method, device, equipment and medium for processing scanned data. For ease of understanding, the embodiments of the present application are described below.

Figure 1:
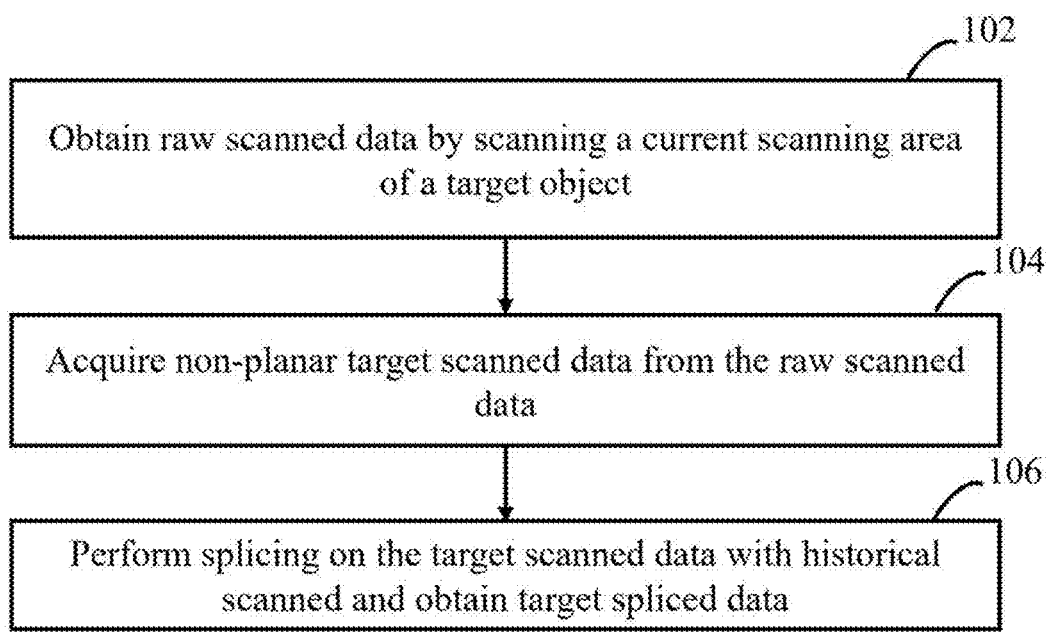
FIG. 1 is a flowchart of a scanned data processing method according to an embodiment of the present application.

FIG. 1 is a flowchart of a scanned data processing method provided by an embodiment of the present application, and the method may be executed by a device for scanned data configured in a terminal. Referring to FIG. 1, the scanned data processing method may include the following steps:

Step S102, raw scanned data is obtained by scanning a current scanning area of a target object.

In this embodiment, the target object is an object to be scanned, such as a small handheld object or a three-dimensional model. When scanning the target object, the target object is usually placed on a plane such as a rotating platform or a stage.

In some implementations, the target object may be pre-divided into multiple scanning areas, and the multiple scanning areas may completely cover the surface of the target object, and there may be an overlapping area between each two adjacent scanning areas, so as to avoid areas on the surface of the target object being missed from scanning. According to this scenario, when scanning the target object, a series of operations such as subsequent scanning, data processing, and splicing may be performed on each scanning area one by one in a preset scanning order. Among them, the scanning order may be an order set according to spatial distribution of each scanning area, such as an order of scanning from left to right (or from top to bottom).

Alternatively, in some other implementations, scanning may be started from any position of the target object according to a placement angle of the target object and/or the scanner, and a next scanning position may be determined according to a preset rotation angle. At each scanning position, the area that may be scanned for the target object is the scanning area. In this case, the target object is scanned according to the rotation angle until the target object makes one revolution round and then stopped. Of course, the above are only examples of the scanning area, and other methods of determining the scanning area may also be used in actual applications, which are not limited here. According to this scenario, when scanning the target object, the scanning position may be determined in sequence according to the rotation angle, and a series of operations such as subsequent scanning, data processing, and splicing may be performed on the scanning area at the current scanning position.

In a possible embodiment, a scanning device, such as a 3D scanner, may be used to scan the current scanning area based on principle of optical scanning technology, thereby obtaining the raw scanned data of the current scanning area. The raw scanned data is 3D data, such as a 3D image, 3D point cloud data, etc. Specifically, a 2D image of the current scanning area is obtained by a camera of the 3D scanner, and the 2D image is reconstructed in 3D (for example, binocular stereo vision principle) to obtain the raw scanned data. Since the target object is placed on a plane, it is difficult to avoid that the raw scanned data will contain the scanned data of the plane. Taking an image as an example, the raw scanned data may contain an image of the current scanning area of the target object, including an image of the plane.

Step S104, non-planar target scanned data from the raw scanned data is acquired.

It can be understood that in the raw scanned data, the planar scanned data will interfere with final scan result of the target object, affecting processing efficiency and accuracy of the scan result. Based on this, the present embodiment may remove the planar scanned data from the raw scanned data and only obtain the non-planar target scanned data. In some implementations, the planar data of the raw scanned data may be identified, and accordingly, the data other than the planar data of the raw scanned data is the non-planar target scanned data.

Step S106, splicing on the target scanned data with historical scanned data is performed and target spliced data is obtained, where the historical scanned data corresponds to a previously scanned area. Illustratively, the historical scanned data may be a frame of non-planar target scanned data corresponding to the previously scanned area, or data spliced from multiple frames of target scanned data.

In an embodiment of feature splicing on target scanned data and historical scanned data, the following contents may be referred to, including:

Surface features of the target scanned data are extracted and first feature data is obtained. The surface features may include spatial geometric features, texture features, curvature features, color features, and histograms, etc. The surface features of the target scanned data are extracted by a preset feature extraction algorithm to obtain the first feature data. The feature extraction algorithm is, for example, a three-dimensional histogram method, which is not limited here.

This embodiment may better preserve richer geometric or texture details of the target object surface by extracting the surface features of the target scanned data, thereby effectively reducing data loss.

Then, according to the first feature data and the second feature data, the target scanned data and the historical scanned data are spliced and target spliced data is obtained.

The second feature data is the surface feature of the historical scanned data, which is used to represent the surface feature corresponding to the previous scanning area of the current scanning area. The second feature data is obtained when scanning and processing the previous scanning area, and specifically includes:

Scan the scanning area Si (i is an integer greater than 1) to obtain raw scanned data corresponding to the scanning area Si, obtain non-planar target scanned data from the raw scanned data; extract surface features of the target scanned data to obtain feature data.

In this embodiment, the target scanned data and the historical scanned data are spliced according to the first feature data corresponding to the current scanning area SN (i=N, N is an integer greater than 2) and the second feature data corresponding to the previous scanning area SN-1.

In at least one embodiment, the target scanned data and the historical scanned data are spliced according to the first feature data corresponding to the current scanning area SN and the second feature data corresponding to multiple previous scanning areas among the previous scanning areas SN-1, SN-2, SN-3, . . . .

In a specific splicing process, the first feature data may also be compared with the second feature data and whether there is an overlapping area is identified. If there is no overlapping area, it means that the scanned data between the current scanning area and the previous scanning area cannot be spliced. If there is an overlapping area, the scanned data between the current scanning area and the previous scanning area can be roughly spliced based on the overlapping area to obtain a relative conversion (i.e., an initial splicing matrix) between the current scanned data and the previous scanned data. That is, the first feature data may be compared with the second feature data to identify whether there is an overlapping area, and the target scanned data and the historical scanned data are roughly spliced based on the overlapping area to obtain the initial splicing matrix.

In at least one embodiment, the first feature data may be compared with the second feature data to identify whether there is homonymous point matching data; if there is no homonymous point matching data, it means that the scanned data between the current scanning area and the previous scanning area may not be spliced. If there is homonymous point matching data, the scanned data between the current scanning area and the previous scanning area may be roughly spliced based on the homonymous point matching data to obtain the relative conversion (i.e., the initial splicing matrix) between the current scanned data and the previous scanned data.

This embodiment first obtains non-planar target scanned data from the raw scanned data, and then uses the target scanned data for subsequent processing such as feature extraction and splicing, which may effectively remove the interference of planar data on subsequent processing, thereby ensuring smoothness and accuracy of splicing. In addition, compared with the existing solution of using labels to assist in splicing, this technical solution does not require the addition of labels, and there will be no problem of labels blocking the surface features of the target object, thereby increasing data details such as geometry and texture.

According to the above embodiment, after the process of scanning the current area of the target object, acquiring non-planar data, extracting feature data and splicing data, the next scanning area of the target object is determined, and the above process is executed again for the next scanning area until the entire surface of the target object is scanned. At this time, a complete scanning result corresponding to the target object may be obtained.

Figure 2:
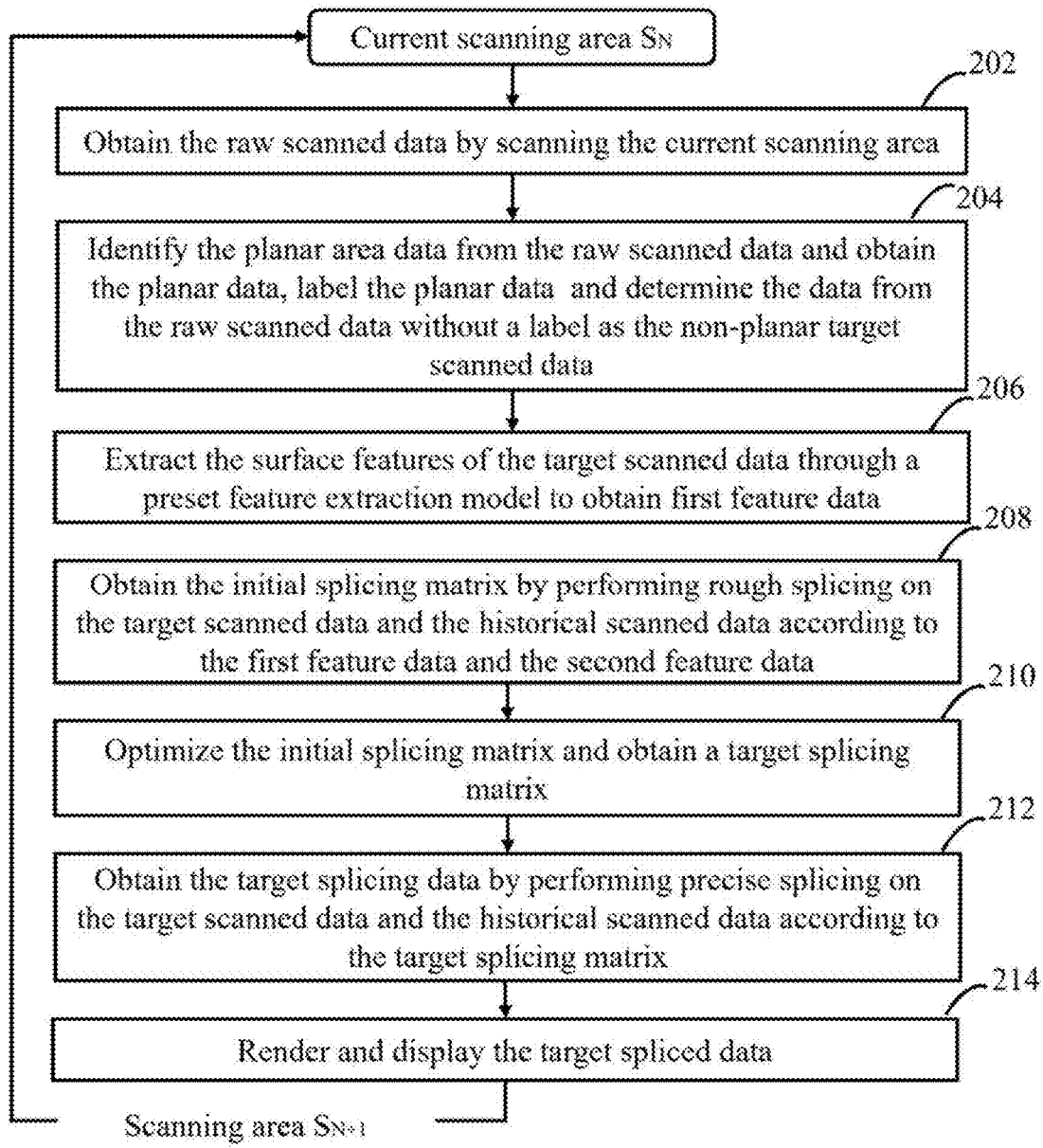
FIG. 2 is a flowchart of another scanned data processing method according to an embodiment of the present application.

Referring to FIG. 2, this embodiment may also provide a method for processing scanned data as follows. For the current scanning area SN, the following steps are performed:

Step S202, the raw scanned data is obtained by scanning the current scanning area.

Step S204, the planar area data is identified from the raw scanned data and the planar data is obtained, the planar data is labeled, and the data from the raw scanned data without a label is determined as the non-planar target scanned data.

There are multiple ways to identify the plane area data in this embodiment. For example, the planar data may be identified based on depth information of each pixel of the raw scanned data. In order to distinguish between the planar data and the non-planar data, the planar data may be labeled, that is, the data associated with the label is the planar data, and the data without the label is the non-planar target scanned data.

In this embodiment, the planar data with the label may be set not to participate in the splicing process, so that the other data in the raw scanned data except the planar data is used as the target scanned data for subsequent splicing. Alternatively, the planar data may be directly deleted from the raw scanned data, and the remaining data is used as the target scanned data.

Step S206, the surface features of the target scanned data are extracted through a preset feature extraction model to obtain first feature data. The surface features include but are not limited to spatial geometric features and/or texture features. The feature extraction model is any model that may extract surface features.

Step S208, the initial splicing matrix is obtained by performing rough splicing on the target scanned data and the historical scanned data according to the first feature data and the second feature data. Specifically, the first feature data and the second feature data are matched to obtain a matching result. The matching result may be the matching data with the same names or the overlapping area. The initial splicing matrix is obtained according to the matching result. The initial splicing matrix may be used to represent the relative conversion between the current scanned data and the previous scanned data. For the above matching result, taking the scene where the target object is a three-dimensional face model as an example, the matching data may be key points of eyes, mouth and other parts, and the overlapping area may be partial area of the eyes, mouth and other parts.

Step S210, the initial splicing matrix is optimized and a target splicing matrix is obtained.

Specifically, the initial splicing matrix may be optimized according to an iterative closest point (ICP) algorithm. The ICP algorithm is based on the Expectation-maximization (EM) algorithm method and uses the alternating iteration method to optimize and obtain an optimal value. In this embodiment, the initial splicing matrix may be iteratively optimized as follows according to the ICP algorithm: an optimized target splicing matrix is obtained by optimizing point cloud matching and optimizing motion estimation. Among them, the point cloud matching is performed by finding a nearest point of the second feature data corresponds to a point of the first feature data in a same coordinate system which the first feature data and the second feature data are projected, and use the nearest point of the second feature data and the point of the first feature data as a pair of matching points. Motion estimation is performed by constructing and solving a least squares equation based on the matching points between the first feature data and the second feature data.

Step S212, the target splicing data is obtained by performing precise splicing on the target scanned data and the historical scanned data according to the target splicing matrix. The target splicing matrix obtained by optimizing the initial splicing matrix according to the ICP algorithm in this embodiment may more accurately express the conversion, and then, the target scanned data and the historical scanned data are precise spliced by using the target splicing matrix, which may achieve more accurate splicing and improve splicing accuracy.

Step S214, the target spliced data is rendered and displayed. There are many ways to render and display the target spliced data, such as, using MATLAB tools to implement data graphical rendering and display, using image operators to implement data graphical rendering and display, the image operator is a matrix operation for image processing, no examples are given here.

In addition, after completing the data processing of the current scanning area, the planar data may be deleted from the raw scanned data according to the label; or the planar data may be remained and the planar data and the target scanned data may be distinguished by the label.

According to the above embodiment, after the scanning processing operation including the above processing processes such as scanning, non-planar data acquisition, feature data extraction and data splicing is completed for the current scanning area SN, the next scanning area SN+1 is determined according to the scanning order or rotation angle, and the next scanning area SN+1 is used as the new current scanning area, and the above scanning processing operation is re-executed for the new current scanning area. And so on, until the scanning processing operation is completed for all scanning areas, and then the complete scanning result corresponding to the target object may be obtained.

In summary, the scanned data processing method provided by the embodiment of the present application includes: scanning the current scanning area of the target object to obtain raw scanned data; obtaining non-planar target scanned data from the raw scanned data; and performing feature splicing on the target scanned data and the historical scanned data to obtain target splicing data. In the present technical solution, the target scanned data after the interference of the planar data is removed is used for subsequent processing such as feature extraction and splicing, which can ensure the smoothness and accuracy of the splicing. Therefore, compared with the existing solution using labels to assist in splicing, the present technical solution does not need to rely on adding labels, avoids the occlusion of surface features, can ensure that the geometric, texture and other data details of the target object scan are not lost, and improves the smoothness and accuracy of the splicing scan.

Figure 3:
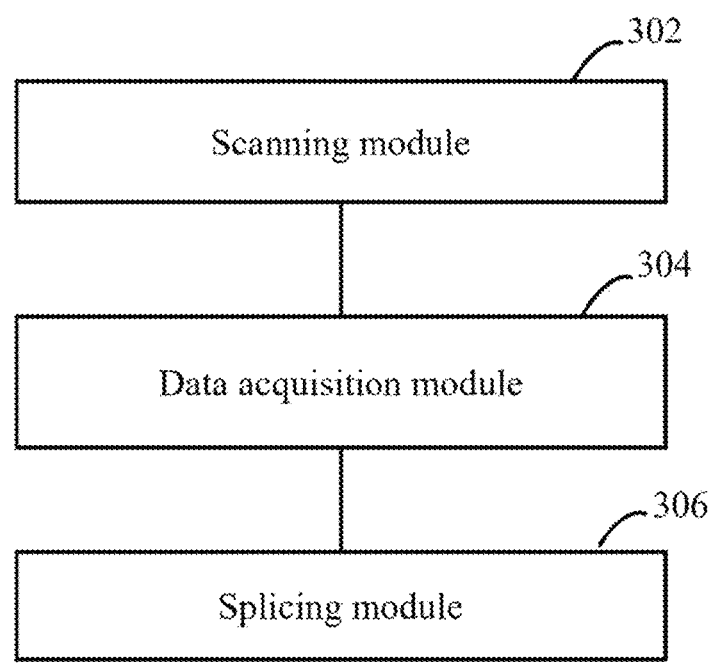
FIG. 3 is a structural block diagram of an apparatus for processing scanned data according to an embodiment of the present application.

FIG. 3 is a block diagram of a scanned data processing apparatus provided in an embodiment of the present application, and the apparatus may be used to implement the scanned data processing method in the above embodiment. Referring to FIG. 3, the scanned data processing apparatus may include:

A scanning module 302 is used to obtain raw scanned data by scanning a current scanning area of a target object;

A data acquisition module 304 is used to acquire non-planar target scanned data from the raw scanned data;

A splicing module 306 is used to perform splicing on the target scanned data with historical scanned data and obtaining target spliced data, where the historical scanned data corresponds to a previously scanned area.

In one embodiment, the data acquisition module 304 is further configured to:
identify planar area data from the raw scanned data and obtaining the planar data;
label the planar data;
determine data from the raw scanned data without a label as the non-planar target scanned data.

In one embodiment, the apparatus further includes a data deletion module, which is used to delete the planar data from the raw scanned data according to the label.

In one embodiment, the splicing module 306 is further configured to:
extract surface features of the target scanned data and obtaining first feature data;
perform splicing on the target scanned data and the historical scanned data according to the first feature data and second feature data, wherein the second feature data represent surface features of the historical scanned data.

In one embodiment, the splicing module 306 is further used to obtain the first feature data by extracting the surface features of the target scanned data through a preset feature extraction model, where the surface features include spatial geometric features and/or texture features.

In one embodiment, the splicing module 306 is further configured to:
obtain an initial splicing matrix by performing rough splicing on the target scanned data and the historical scanned data according to the first feature data and the second feature data;
optimize the initial splicing matrix and obtaining a target splicing matrix;
obtain target splicing data by performing precise splicing on the target scanned data and the historical scanned data according to the target splicing matrix;
render and display the target splicing data.

The step of the obtaining the initial splicing matrix by performing rough splicing on the target scanned data and the historical scanned data according to the first feature data and the second feature data includes:
identifying whether there is an overlapping area by comparing the first feature data with the second feature data, and obtaining the initial splicing matrix by performing rough splicing on the target scanned data and the historical scanned data according to the overlapping area.

The implementation principle and technical effects of the device provided in this embodiment are the same as those of the method embodiment. For sake of brief description, for matters not mentioned in the device embodiment, reference may be made to the corresponding contents in the above mentioned method embodiment.

Figure 4:
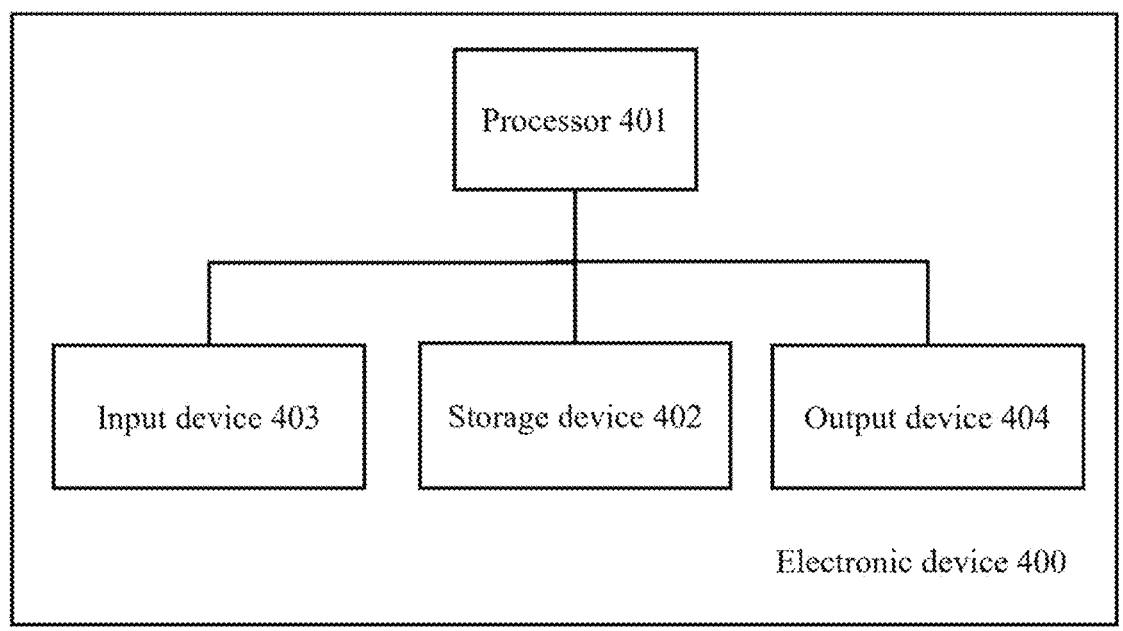
FIG. 4 is a schematic diagram of a structure of an electronic device according to an embodiment of the present application.

FIG. 4 is a schematic diagram of the structure of an electronic device provided by an embodiment of the present application. As shown in FIG. 4, the electronic device 400 includes one or more processors 401 and a storage device 402.

The processor 401 may be a central processing unit (CPU) or other forms of processing units having data processing capabilities and/or instruction execution capabilities, and may control other components in the electronic device 400 to perform desired functions.

The storage device 402 may include one or more computer program products, which may include various forms of computer-readable storage media, such as volatile memory and/or non-volatile memory. The volatile memory may include, for example, a random access memory (RAM) and/or a cache memory (cache), etc. The non-volatile memory may include, for example, a read-only memory (ROM), a hard disk, a flash memory, etc. One or more computer program instructions may be stored on the computer-readable storage medium, and the processor 401 may run the program instructions to implement the scanned data processing method of the embodiment of the present application described above and/or other desired functions. Various contents such as input signals, signal components, noise components, etc. may also be stored in the computer-readable storage medium.

In one example, the electronic device 400 may further include: an input device 403 and an output device 404, and these components are interconnected via a bus system and/or other forms of connection mechanisms (not shown).

In addition, the input device 403 may also include, for example, a keyboard, a mouse, and the like.

The output device 404 may output various information to the outside, including the determined distance information, direction information, etc. The output device 404 may include, for example, a display, a speaker, a printer, a communication network and a remote output device connected thereto, and the like.

Of course, for simplicity, FIG. 4 only shows some of the components related to the present application in the electronic device 400, omitting components such as a bus, an input/output interface, etc. In addition, the electronic device 400 may further include any other appropriate components according to specific application scenarios.

Furthermore, this embodiment also provides a computer-readable storage medium, wherein the storage medium stores a computer program, and the computer program is used to execute the above-mentioned scanned data processing method.

The embodiments of the present application provide a method, device, electronic device, and medium for processing scanned data, including a computer-readable storage medium storing program code. The instructions included in the program code can be used to execute the methods described in the previous method embodiments. The specific implementation can be found in the method embodiments, which will not be repeated here.

It should be noted that, in this article, relational terms such as "first" and "second" are only used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the sentence "comprise a . . . " do not exclude the existence of other identical elements in the process, method, article or device including the elements.

The above description is only a specific embodiment of the present application, so that those skilled in art may understand or implement the present application. Various modifications to these embodiments will be apparent to those skilled in art, and the general principles defined herein may be implemented in other embodiments without departing from the spirit or scope of the present application. Therefore, the present application will not be limited to the embodiments shown herein but will conform to the widest scope consistent with the principles and novel features disclosed herein.

INDUSTRIAL APPLICABILITY

The scanned data processing method provided by the present application uses target scanned data after removing planar data interference for subsequent processing such as splicing, which may ensure smoothness and accuracy of splicing and has strong industrial applicability.

What is claimed is:

1. A scanned data processing method, the method comprising:

obtaining raw scanned data by scanning a current scanning area of a target object;

acquiring non-planar target scanned data from the raw scanned data;

performing splicing on the non-planar target scanned data with historical scanned data and obtaining target spliced data, the historical scanned data corresponding to a previously scanned area, wherein the performing splicing on the non-planar target scanned data with historical scanned data comprises:

extracting surface features of the non-planar target scanned data and obtaining first feature data;

performing splicing on the non-planar target scanned data and the historical scanned data according to the first feature data and second feature data, wherein the second feature data represent surface features of the historical scanned data.

2. The method according to claim 1, wherein acquiring the non-planar target scanned data from the raw scanned data comprises:

identifying planar area data from the raw scanned data and obtaining the planar data;

labeling the planar data;

determining data from the raw scanned data without a label as the non-planar target scanned data.

3. The method according to claim 2, further comprising:

deleting the planar data from the raw scanned data according to the label.

4. The method according to claim 1, wherein extracting surface features from the non-planar target scanned data and obtaining the first feature data comprises:

obtaining the first feature data by extracting the surface features from the non-planar target scanned data using a preset feature extraction model, wherein the surface features comprise spatial geometric features and/or texture features.

5. The method according to claim 1, wherein performing splicing on the non-planar target scanned data and the historical scanned data according to the first feature data and the second feature data comprises:

obtaining an initial splicing matrix by performing rough splicing on the non-planar target scanned data and the historical scanned data according to the first feature data and the second feature data;

optimizing the initial splicing matrix and obtaining a target splicing matrix;

obtaining target splicing data by performing precise splicing on the non-planar target scanned data and the historical scanned data according to the target splicing matrix;

rendering and displaying the target splicing data.

6. The method according to claim 5, wherein the obtaining the initial splicing matrix by performing rough splicing on the non-planar target scanned data and the historical scanned data according to the first feature data and the second feature data comprises:

identifying whether there is an overlapping area by comparing the first feature data with the second feature data, and obtaining the initial splicing matrix by performing a rough splicing on the non-planar target scanned data and the historical scanned data according to the overlapping area.

7. An electronic device, comprising:

a storage device storing at least one instruction; and a processor, when the at least one instruction is executed by the processor, the processor is caused to:

obtain raw scanned data by scanning a current scanning area of a target object;

acquire non-planar target scanned data from the raw scanned data;

perform splicing on the non-planar target scanned data with historical scanned data and obtain target spliced data, the historical scanned data corresponding to a previously scanned area, wherein the perform splicing on the non-planar target scanned data with historical scanned data comprises:

extract surface features of the non-planar target scanned data and obtain first feature data;

perform splicing on the non-planar target scanned data and the historical scanned data according to the first feature data and second feature data, wherein the second feature data represent surface features of the historical scanned data.

8. The electronic device according to claim 7, wherein the processor acquires the non-planar target scanned data from the raw scanned data by:

identifying planar area data from the raw scanned data and obtaining the planar data;

labeling the planar data;

determining data from the raw scanned data without a label as the non-planar target scanned data.

9. The electronic device according to claim 8, wherein the processor is further caused to:

delete the planar data from the raw scanned data according to the label.

10. The electronic device according to claim 7, wherein the processor extracts surface features from the non-planar target scanned data and obtaining the first feature data by:

obtaining the first feature data by extracting the surface features from the non-planar target scanned data using a preset feature extraction model, wherein the surface features comprise spatial geometric features and/or texture features.

11. The electronic device according to claim 7, wherein the processor performs splicing on the non-planar target scanned data and the historical scanned data according to the first feature data and the second feature data by:

obtaining an initial splicing matrix by performing rough splicing on the non-planar target scanned data and the historical scanned data according to the first feature data and the second feature data;

optimizing the initial splicing matrix and obtaining a target splicing matrix;

obtaining target splicing data by performing precise splicing on the non-planar target scanned data and the historical scanned data according to the target splicing matrix;

rendering and displaying the target splicing data.

12. The electronic device according to claim 11, wherein the processor obtains the initial splicing matrix by performing rough splicing on the non-planar target scanned data and the historical scanned data according to the first feature data and the second feature data by:

identifying whether there is an overlapping area by comparing the first feature data with the second feature data, and obtaining the initial splicing matrix by performing a rough splicing on the non-planar target scanned data and the historical scanned data according to the overlapping area.

13. A non-transitory storage medium having at least one instruction stored thereon, when the at least one instruction is executed by a processor of an electronic device, the processor is caused to perform a scanned data processing method, wherein the method comprises:

obtaining raw scanned data by scanning a current scanning area of a target object;

acquiring non-planar target scanned data from the raw scanned data;

performing splicing on the non-planar target scanned data with historical scanned data and obtaining target spliced data, the historical scanned data corresponding to a previously scanned area, wherein the performing splicing on the non-planar target scanned data with historical scanned data comprises:

extracting surface features of the non-planar target scanned data and obtaining first feature data;

performing splicing on the non-planar target scanned data and the historical scanned data according to the first feature data and second feature data, wherein the second feature data represent surface features of the historical scanned data.

14. The non-transitory storage medium according to claim 13, wherein acquiring the non-planar target scanned data from the raw scanned data comprises:

identifying planar area data from the raw scanned data and obtaining the planar data;

labeling the planar data;

determining data from the raw scanned data without a label as the non-planar target scanned data.

15. The non-transitory storage medium according to claim 14, wherein the method further comprises:

deleting the planar data from the raw scanned data according to the label.

16. The non-transitory storage medium according to claim 13, wherein performing splicing on the non-planar target scanned data and the historical scanned data according to the first feature data and the second feature data comprises:

obtaining an initial splicing matrix by performing rough splicing on the non-planar target scanned data and the historical scanned data according to the first feature data and the second feature data;

optimizing the initial splicing matrix and obtaining a target splicing matrix;

obtaining target splicing data by performing precise splicing on the non-planar target scanned data and the historical scanned data according to the target splicing matrix;

rendering and displaying the target splicing data.

17. The non-transitory storage medium according to claim 16, wherein the obtaining the initial splicing matrix by performing rough splicing on the non-planar target scanned data and the historical scanned data according to the first feature data and the second feature data comprises:

identifying whether there is an overlapping area by comparing the first feature data with the second feature data, and obtaining the initial splicing matrix by performing a rough splicing on the non-planar target scanned data and the historical scanned data according to the overlapping area.

* * * * *